(12) United States Patent
Marchlik et al.

(10) Patent No.: US 9,590,384 B2
(45) Date of Patent: Mar. 7, 2017

(54) ABSORBER FOR WAKEFIELD INTERFERENCE MANAGEMENT AT THE ENTRANCE OF THE WIGGLER OF A FREE ELECTRON LASER

(71) Applicant: JEFFERSON SCIENCE ASSOCIATES, LLC, Newport News, VA (US)

(72) Inventors: Matthew Marchlik, Newport News, VA (US); George Herman Biallas, Yorktown, VA (US)

(73) Assignee: JEFFERSON SCIENCE ASSOCIATES, LLC, Newport News, VA (US)

( * ) Notice: Subject to any disclaimer, the term of this patent is extended or adjusted under 35 U.S.C. 154(b) by 0 days.

(21) Appl. No.: 15/151,903

(22) Filed: May 11, 2016

(65) Prior Publication Data

US 2016/0336712 A1    Nov. 17, 2016

Related U.S. Application Data

(60) Provisional application No. 62/160,306, filed on May 12, 2015.

(51) Int. Cl.
  *H01S 3/0959*  (2006.01)
  *H01S 3/09*    (2006.01)
  *H01S 1/00*    (2006.01)

(52) U.S. Cl.
  CPC ........... *H01S 3/0903* (2013.01); *H01S 1/005* (2013.01)

(58) Field of Classification Search
  CPC .............................. H01S 1/005; H01S 3/0903
  USPC .............................................................. 372/2
  See application file for complete search history.

(56) References Cited

U.S. PATENT DOCUMENTS

| 4,888,776 | A  | * | 12/1989 | Dolezal | ................. | H01S 3/0903 |
|           |    |   |         |         |                   | 315/111.81  |
| 5,144,193 | A  | * | 9/1992  | Warren  | .................... | H05H 7/18 |
|           |    |   |         |         |                   | 315/4       |
| 9,209,587 | B2 | * | 12/2015 | Biallas | ................. | H01S 3/0903 |

* cited by examiner

*Primary Examiner* — Tod T Van Roy

(57) ABSTRACT

A method for managing the broad band microwave and TeraHertz (THz) radiation in a free electron laser (FEL) having a wiggler producing power in the electromagnetic spectrum. The method includes placement of broadband microwave and TeraHertz (THz) radiation absorbers on the upstream end of the wiggler. The absorbers dampen the bounced back, broad band microwave and THz radiation returning from the surfaces outside the nose of the cookie-cutter and thus preventing broadening of the electron beam pulse's narrow longitudinal energy distribution. Broadening diminishes the ultimate laser power from the wiggler. The broadband microwave and THz radiation absorbers are placed on either side of the slot in the cookie-cutter that shapes the wake field wave of the electron pulse to the slot shape of the wiggler chamber aperture. The broad band microwave and THz radiation absorber is preferably a non-porous pyrolytic grade of graphite with small grain size.

11 Claims, 5 Drawing Sheets

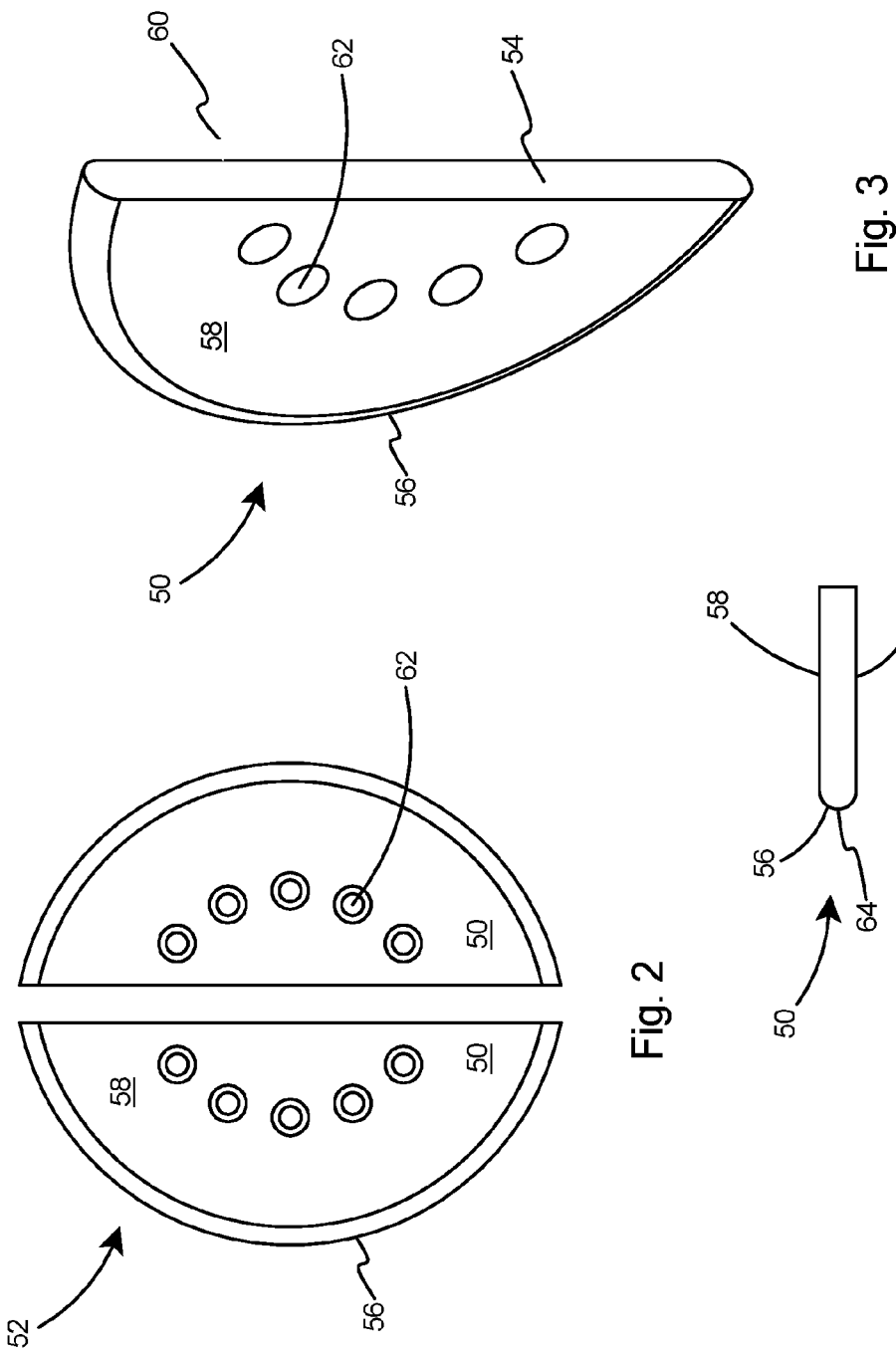

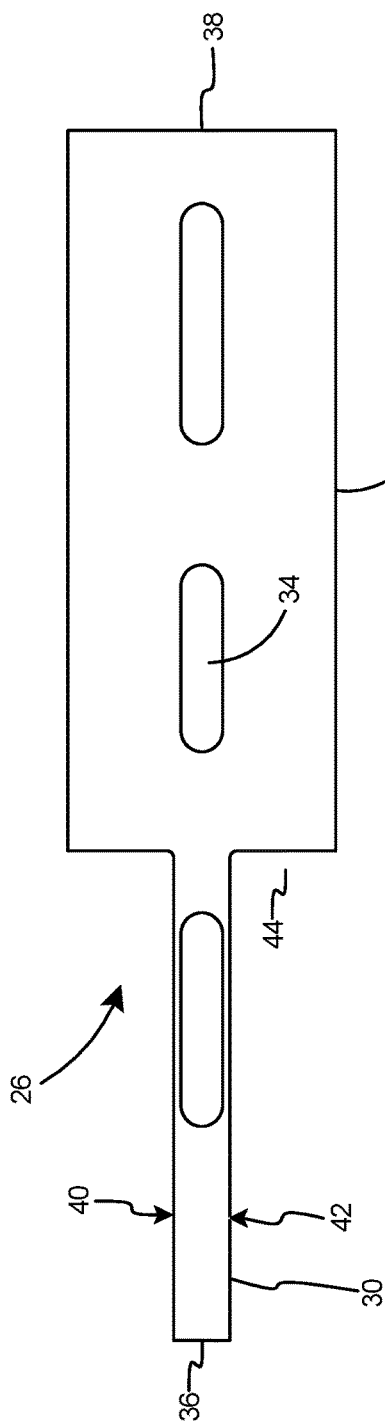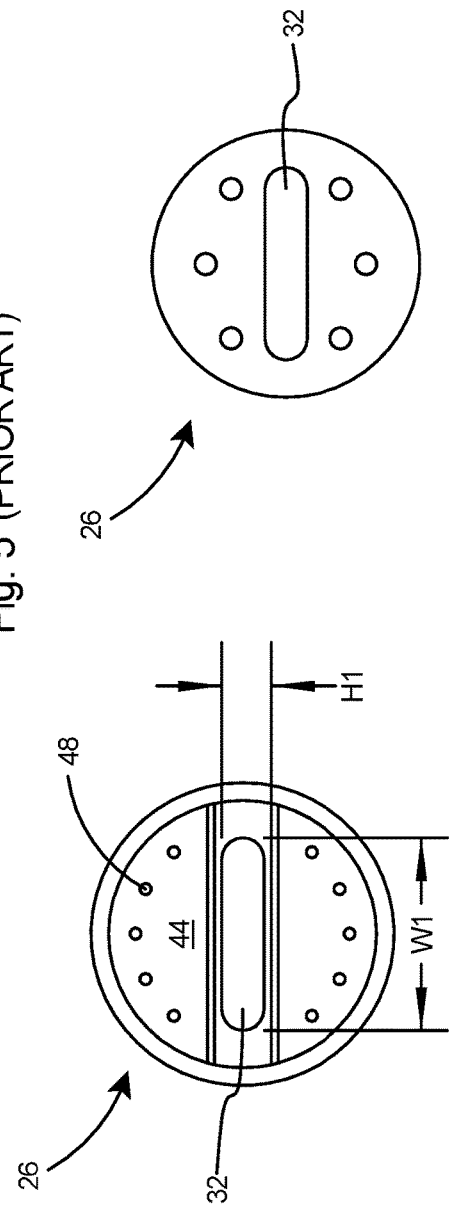
Fig. 5 (PRIOR ART)
Fig. 7 (PRIOR ART)
Fig. 6 (PRIOR ART)

ABSORBER FOR WAKEFIELD INTERFERENCE MANAGEMENT AT THE ENTRANCE OF THE WIGGLER OF A FREE ELECTRON LASER

CROSS-REFERENCE TO RELATED APPLICATIONS

This application claims the priority of Provisional U.S. patent application Ser. No. 62/160,306 filed May 12, 2015.

GOVERNMENT LICENSE RIGHTS STATEMENT

This invention was made with government support under Management and Operating Contract No. DE-ACO5-060R23177 awarded by the Department of Energy. The United States Government has certain rights in the invention.

FIELD OF THE INVENTION

The present invention relates to free electron (FEL) lasers and more particularly to a method and apparatus that prevents broadening the electron beam pulse's narrow longitudinal energy distribution upon entering the FEL's wiggler. The invention absorbs the broadband microwave and TeraHertz (THz) radiation bounced back from the surfaces at the upstream end of the wiggler before it can broaden the energy distribution.

BACKGROUND

In a free electron laser (FEL) an electron beam is directed through a wiggler which includes a series of magnets with alternating poles that bend the electron beam in a sinusoidal path to generate laser light. A cookie-cutter 26, such as shown in FIG. 1, is positioned at the upstream end of the wiggler to cut the electromagnetic wake field wave advancing through the beam tube's round aperture into the slot shaped wave entering the slot aperture of the wiggler.

Referring to FIG. 1, the cookie-cutter 26 includes a body or thermal mass extension 28 and a nose portion 30. The nose portion 30 includes a wide slot 32 that extends longitudinally through the body 28 and matches the wiggler chamber's aperture. The wide slot 32 conforms substantially to the 3:1 rule for electron beam impedance control through the wiggler. The shape of the slot and the width (W1, see FIG. 6) being substantially 3 times the height (H1, see FIG. 6) of the slot 32 is critical to minimizing beam impedance through the wiggler. The cookie-cutter is preferably machined from a single piece of oxygen-free high conductivity (OFHC) copper. OFHC copper includes a substantially high thermal conductivity to drain away deposited heat. This copper also has a high level of chemical purity beneficial in high vacuum applications. A plurality of vent slots 34 extend into the nose portion 30 and the cookie-cutter body 28 in order to provide vacuum conductivity. The cookie-cutter 26 includes an upstream end 36, a downstream end 38, and a substantially cylindrical body 28. The nose portion 30 includes a flat top 40 surface and flat bottom 42 surface. The flat top and bottom surfaces 40 and 42 terminate in a planar face 44 on the body 28 that is substantially perpendicular to the longitudinal axis 46 of the cookie-cutter 26. A plurality of threaded mount holes 48 are provided, extending into the body 28 from each planar face 44 of the cookie-cutter.

Although the cookie-cutter controls the wake field wave entering the wiggler's slotted aperture, the remaining cut-off portions of the wake field are still active and will bounce back as broad band microwave and TeraHertz (THz) radiation toward the upstream and, if not damped, will interfere with the forward moving wake field of the oncoming electron beam pulse. The wake field interference broadens the electron beam pulse's narrow longitudinal energy distribution and diminishes ultimate laser power. Thus there is a need to minimize the amount of bounced back radiation returning from the outer edges of the cookie-cutter that defines the wiggler chamber aperture.

OBJECT OF THE INVENTION

The object of the present invention is to provide, in a free electron laser, a method for minimizing the amount of bounced back broad band microwave and TeraHertz (THz) radiation returning from the outer edges of the cookie-cutter and thus prevent broadening the electron beam pulse's narrow longitudinal energy distribution that would decrease the ultimate power of the laser.

SUMMARY OF THE INVENTION

The present invention provides a method for managing the broadband microwave and TeraHertz (THz) radiation in a free electron laser (FEL) having a wiggler producing the laser light. The method includes placement of THz absorbers on the upstream end of the wiggler to dampen the bounced back broad band microwave and TeraHertz (THz) radiation returning from the cookie-cutter and thus minimizing broadening narrow longitudinal energy distribution of the forward moving pulses of electrons. The THz absorbers are placed downstream of and on either side of the nose portion of the cookie-cutter that shapes the pulses's wake field to the slot form of the wiggler chamber aperture. The THz absorber is preferably a non-porous pyrolytic grade of graphite with small grain size.

BRIEF DESCRIPTION OF THE SEVERAL VIEWS OF THE DRAWINGS

Reference is made herein to the accompanying drawings, which are not necessarily drawn to scale, and wherein:

FIG. 2 is a front elevation view of the terahertz absorber.

FIG. 3 is an isometric view of a first half of a terahertz (THz) absorber according to the present invention.

FIG. 4 is an end view of the first half of the terahertz absorber of FIG. 3.

FIG. 5 is a side view of the cookie-cutter of FIG. 1.

FIG. 6 is a front view of the cookie-cutter as viewed from the left side of FIG. 5.

FIG. 7 is a rear view of the cookie-cutter as viewed from the right side of FIG. 5.

DETAILED DESCRIPTION

Figure 1:
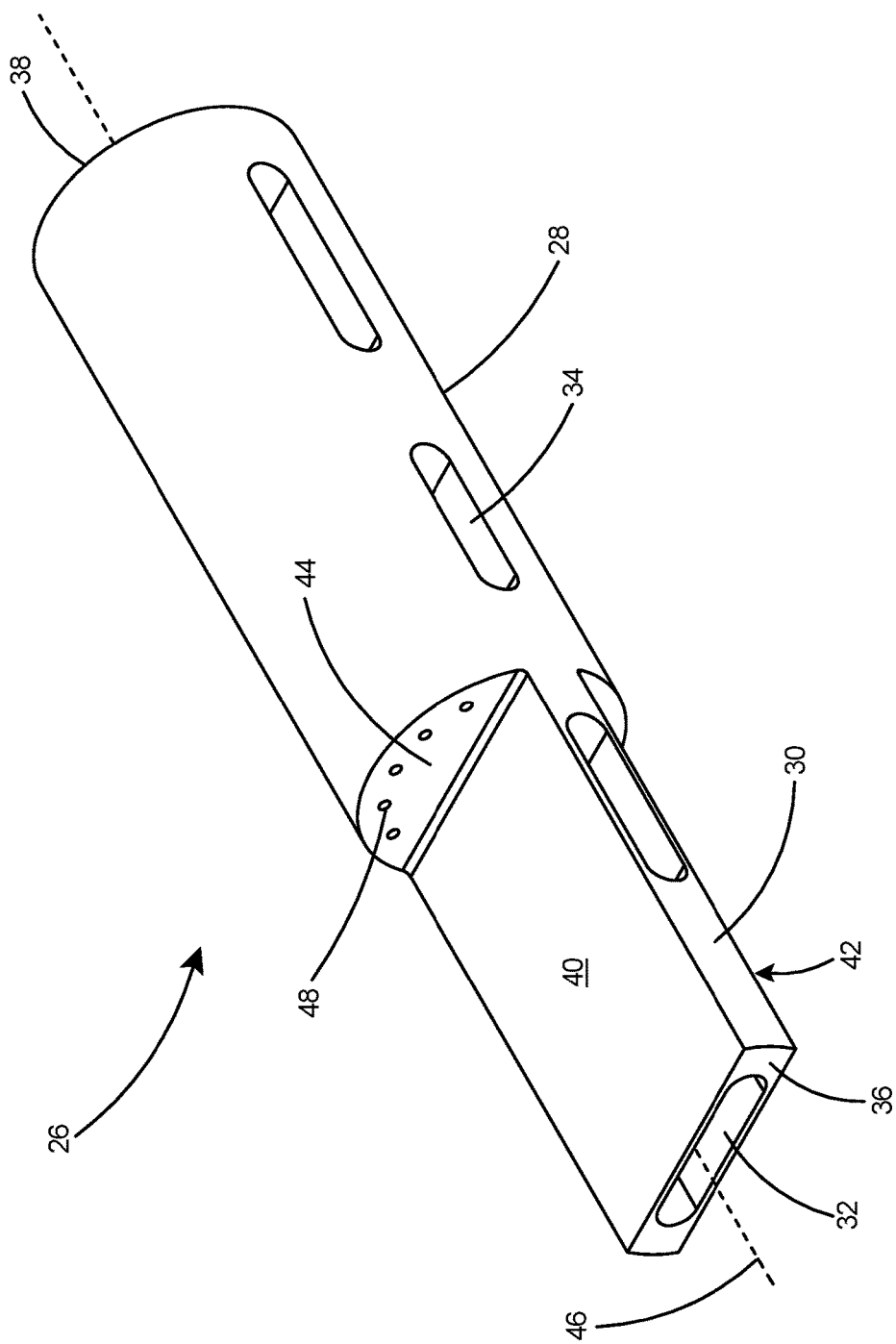
FIG. 1 is an isometric view of a cookie-cutter that is positioned at the entry of a wiggler to cut the electromagnetic wake field wave of the electron beam pulse entering the wiggler.

The present invention, referring to FIGS. 2-4, includes two half portions 50 of an absorber 52 for absorbing broadband microwave and TeraHertz (THz) radiation. The absorber 52 minimizes the amount of bounced back or reflected radiation returning from the outer edges of the cookie-cutter and thus prevents broadening the electron beam pulse's narrow longitudinal energy distribution and resulting diminished laser power from the wiggler. Each half portion 50 of the THz absorber 52 is a semi-circular disk including a flat side 54, an arcuate side 56, a planar upstream surface 58, a planar downstream surface 60, and a plurality of bolt holes 62 therein. The arcuate side 56 of each absorber half 50 is fully rounded and formed to fit radially within the circular wall of the vacuum chamber surrounding the electron beamline. The perimeter of arcuate side 56 is fully rounded to compensate for any yaw and pitch misalignment about the longitudinal axis 46 (see FIG. 1) between itself and the circular wall of the vacuum chamber. The flat side 54 of each absorber half 50 is formed to fit flush against the flat top and bottom surfaces 40 and 42 (see FIG. 1) of the cookie-cutter 26. The planar downstream surface 60 of each absorber half 50 is formed to fit flush against the planar face 44 of the cookie-cutter (see FIG. 1) that is substantially perpendicular to the longitudinal axis 46. As shown in FIG. 4, the arcuate side 56 of each absorber half 50 includes a rounded surface 64 that is rounded from the upstream surface 58 to the downstream surface 60. Bolt holes 62 in the absorber halves 50 include a bolt-hole pattern to match the pattern of the threaded mount holes 48 on the planar faces 44 of the cookie-cutter (see FIG. 1). The terms "bounced back radiation" and "reflected radiation" are used synonymously herein.

Preferably the absorber halves 50 are each constructed of graphite. Most preferably, the graphite is a non-porous pyrolytic grade of graphite with small grain size. Non-porous graphite is available from Poco Graphite, Inc. of Decatur, Tex., or from Mersen USA of Bay City, Mich. Most preferably, the graphite includes a porosity of between 10 and 20% and an average grain size of between 5 and 20 μm.

Figure 8:
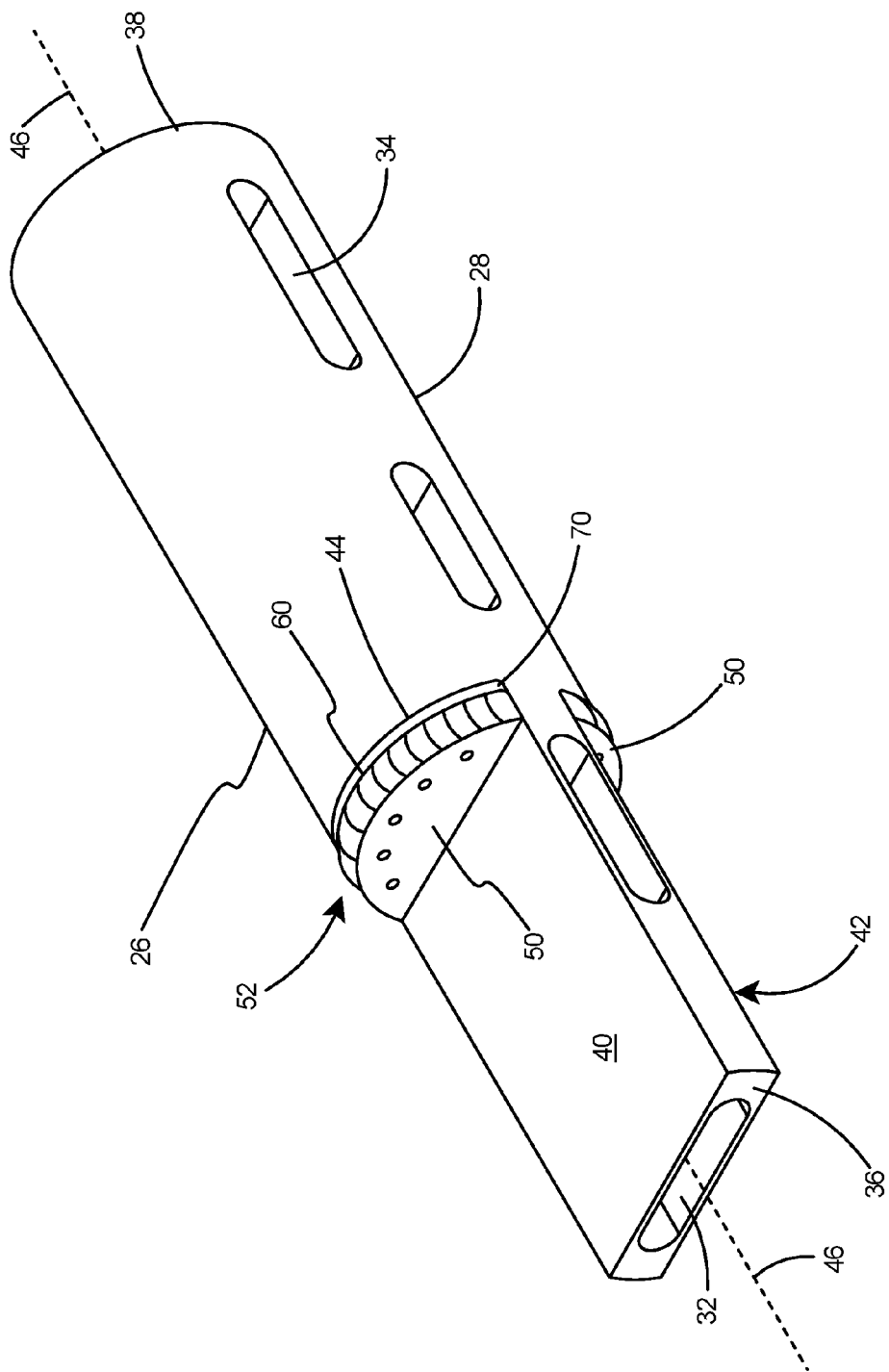
FIG. 8 is an isometric view depicting the THz absorber secured to the planar faces of the cookie-cutter.

With reference to FIG. 8, an absorber 52 for reflected wake field radiation management at the wiggler includes each absorber half 50 fit flush against the respective top and bottom surfaces 40 and 42 of the cookie-cutter 26. The broadband microwave and TeraHertz (THz) radiation absorber halves 50 are placed on either side of the nose 30 that along with slot 32 forms the cutter that matches the wiggler chamber aperture. The planar downstream surfaces 60 of the absorber halves 50 are formed to fit flush against the planar faces 44 that are substantially perpendicular to the longitudinal axis 46. A sheet of indium foil 70 is sandwiched between the planar downstream surface 60 of each absorber half 50 and the corresponding planar face 44 of the cookie-cutter 26. The indium foil 70 acts to reduce the thermal contact resistance between the surfaces 60 of the absorber halves and the planar faces 44 of the cookie-cutter 26, decreasing thermal resistance to the flow of absorbed heat to the cookie-cutter body.

Figure 9:
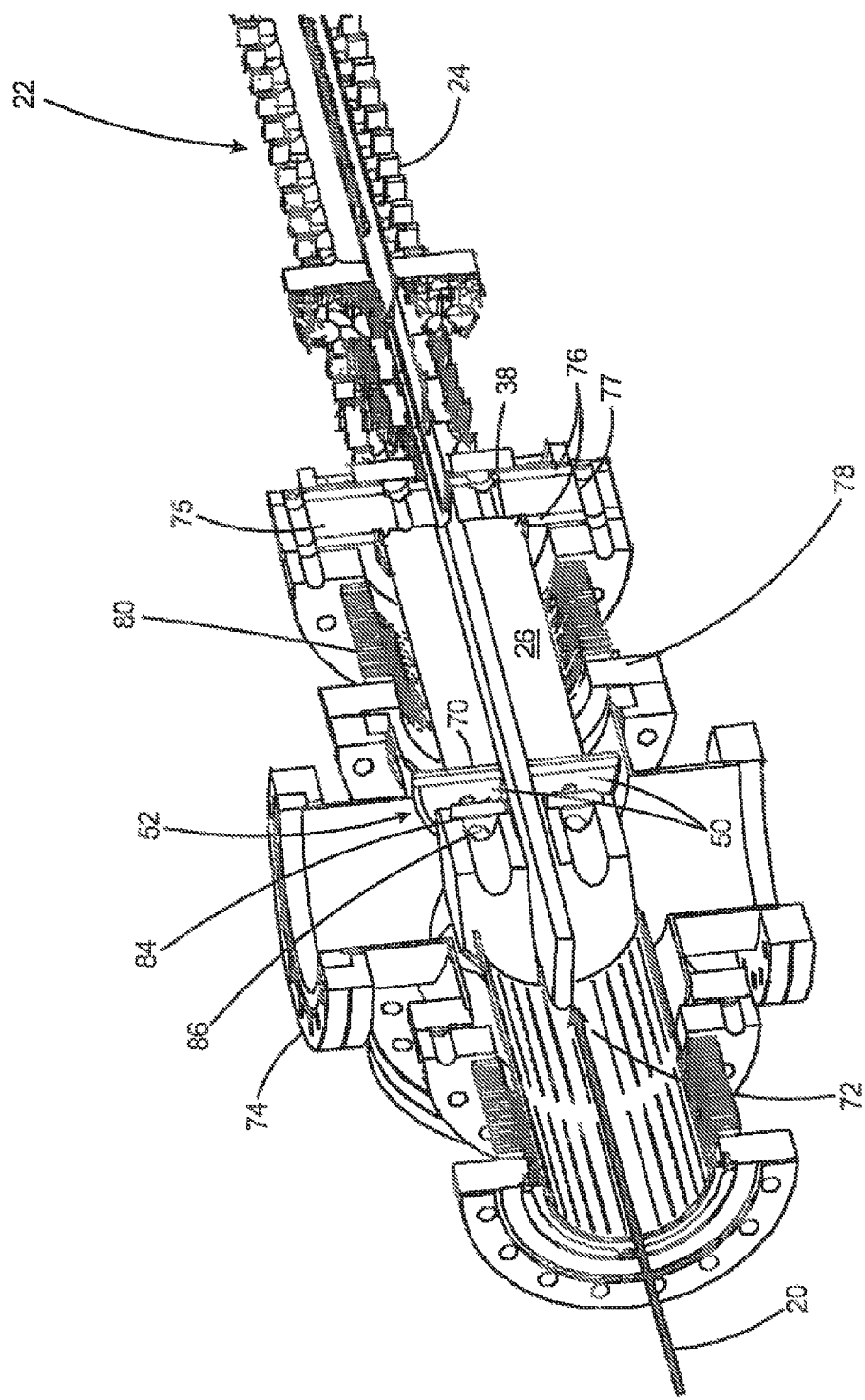
FIG. 9 is an isometric view of a THz absorber according to the present invention installed on a cookie-cutter at the upstream end of a wiggler.

Referring to FIG. 9, the absorber 52 for broad band microwave and TeraHertz (THz) radiation is installed at the entry of the wiggler 22 within the vacuum chamber 72 of a 6-way cross 74. A bi-metallic CF flange 75 comprised of a copper center 77 sandwiched between stainless steel ends 76 that contain the knife sealing edges. The copper center of the flange 77 is fastened to the downstream end 38 of the cookie-cutter 26 and forms a path to conduct adsorbed heat to the outside of the vacuum boundary. A counterbore is machined through the upstream stainless steel portion 76 and into the copper center region 77 of the flange to create a copper-indium-copper contact for good thermal conductivity between the cookie cutter 26 and the copper central portion 77. A bellows 80 extends between conflat flange 78 and the downstream flange of the 6-way cross 74. An aluminum alignment device 84 with a polished mirror surface 86 is used in conjunction with a laser beam (not shown) for aligning the various components of the FEL prior to energizing the electron beam. The bellows 80 enables adjustment along beam direction during assembly of the depicted section of the FEL and also enables minor skewing adjustments of the FEL components to align them perpendicular to the electron beam path. The wiggler 22 includes a series of magnets 24 with alternating poles that bend the electron beam in a sinusoidal path to generate laser light.

The description of the present invention is presented for purposes of illustration and description, but is not intended to be exhaustive or limited to the invention in the form disclosed. Many modifications and variations will be apparent to those of ordinary skill in the art without departing from the scope and spirit of the invention. The embodiment herein was chosen and described in order to best explain the principles of the invention and the practical application, and to enable others of ordinary skill in the art to understand the invention for various embodiments with various modifications as are suited to the particular use contemplated.

What is claimed is:

1. A method for managing reflected wake field energy in the form of broad band microwave and TeraHertz (THz) radiation in a free electron laser (FEL) having a wiggler producing laser light and containing a cookie-cutter for shaping the wake field wave to the wiggler chamber aperture, comprising:
  a nose portion on the upstream end of the cookie-cutter, the nose portion including two flat surfaces, a planar face on the cookie-cutter perpendicular to each of the flat surfaces, and a slot in the nose portion in axial alignment with the wiggler chamber aperture; and
  covering the planar faces of the cookie-cutter with a broadband microwave and TeraHertz (THz) radiation absorber wherein the absorber is a non-porous pyrolytic grade of graphite with small grain size.

2. The method for managing broadband microwave and TeraHertz (THz) radiation of claim 1 wherein the graphite includes a porosity of between 10 and 20%.

3. The method for managing broadband microwave and TeraHertz (THz) radiation of claim 1 wherein the graphite includes an average grain size of between 5 and 20 μm.

4. The method for managing broad band microwave and TeraHertz (THz) radiation of claim 1 wherein the planar faces of the cookie-cutter are of semi-circular shape and the broad band microwave and TeraHertz (THz) radiation absorbers are in the shape of semi-circular disks.

5. The method for managing the broad band microwave and TeraHertz (THz) radiation of claim 4 wherein the semi-circular disks further comprise:
  a flat side; and
  an arcuate side.

6. The method for managing the broad band microwave and TeraHertz (THz) radiation of claim 5 wherein the semi-circular disks further comprise:
  a planar upstream surface;
  a planar downstream surface; and
  a plurality of bolt holes therein.

7. The method for managing the broad band microwave and TeraHertz (THz) radiation of claim 4 further comprising:

providing a vacuum chamber boundary and a two-sided bimetallic CF flange having a copper central portion; and conveying absorbed heat beyond the vacuum chamber boundary by attaching the copper central portion of the two-sided, bimetallic CF flange to the cookie-cutter.

8. The method for managing broad band microwave and TeraHertz (THz) radiation of claim 1 wherein the cookie-cutter is machined from a single piece of oxygen-free high conductivity (OFHC) copper.

9. The method for managing broadband microwave and TeraHertz (THz) radiation of claim 1 further comprising a means of shaping the wake field wave of the electron pulse through the wiggler.

10. The method for managing broad band microwave and TeraHertz (THz) radiation of claim 6 wherein the means of shaping the wake field wave of the electron pulse through the wiggler includes providing the slot in the nose portion with a width that is at least 3 times the height of the slot.

11. The method for managing the broad band microwave and TeraHertz (THz) radiation of claim 1 further comprising:

a planar downstream surface on the THz absorber; and
a sheet of indium foil sandwiched between the planar downstream surface of the THz absorber and the corresponding planar face of the cookie-cutter.

* * * * *